(12) United States Patent
Lewis et al.

(10) Patent No.: US 6,416,805 B1
(45) Date of Patent: Jul. 9, 2002

(54) SPREADABLE GELLED FOOD PRODUCT

(75) Inventors: David Adrian Lewis; Victor Marcus Lewis; Deborah Ann Lewis, all of New South Wales (AU)

(73) Assignee: Byron Australia Pty Limited, New South Wales (AU)

( * ) Notice: Subject to any disclaimer, the term of this patent is extended or adjusted under 35 U.S.C. 154(b) by 0 days.

(21) Appl. No.: 09/155,673

(22) PCT Filed: Mar. 27, 1997

(86) PCT No.: PCT/AU97/00205

§ 371 (c)(1),
(2), (4) Date: Jan. 26, 1999

(87) PCT Pub. No.: WO97/36501

PCT Pub. Date: Oct. 9, 1997

(30) Foreign Application Priority Data

Apr. 2, 1996 (AU) .................................................. 9074

(51) Int. Cl.⁷ .......................... A23L 1/0532; A23L 1/08
(52) U.S. Cl. ........................ 426/573; 426/575; 426/658
(58) Field of Search ................................ 426/575, 658, 426/573

(56) References Cited

U.S. PATENT DOCUMENTS

| | | | | |
|---|---|---|---|---|
| 1,646,657 A | * | 10/1927 | O'Connell | 426/658 |
| 1,842,673 A | * | 1/1932 | Joseph | 426/573 |
| 1,913,576 A | * | 6/1933 | Walsh | 426/573 |
| 1,940,837 A | * | 12/1933 | Bartz | 426/573 |
| 3,718,484 A | * | 2/1973 | Glabe | 99/199 |
| 3,780,185 A | * | 12/1973 | Fields et al. | 426/658 |
| 3,906,114 A | * | 9/1975 | Glabe | 426/641 |
| 4,220,666 A | * | 9/1980 | Feilds | 426/62 |
| 4,504,516 A | * | 3/1985 | Schanze | 426/658 |
| 4,532,143 A | | 7/1985 | Brain et al. | |
| 4,647,463 A | * | 3/1987 | Hoover | 426/291 |
| 4,849,240 A | * | 7/1989 | Giddey et al. | 426/564 |
| 4,919,956 A | * | 4/1990 | Bateson et al. | 426/465 |
| 4,973,491 A | * | 11/1990 | Shin et al. | 426/632 |
| 5,502,181 A | * | 3/1996 | Kajima et al. | 536/123.1 |

FOREIGN PATENT DOCUMENTS

| | | |
|---|---|---|
| FR | 9202196 | 8/1993 |
| JP | 08280334 | 10/1996 |
| WO | WO9220238 | 11/1992 |
| WO | WO9510197 | 4/1995 |

OTHER PUBLICATIONS

Manufacturing Confectioner, vol. 71, No. 6, Jun. 1991, Glen Rock, NJ, M. Varnecke, "Gums and Jelly Products and Formulations", pp. 60–65.

* cited by examiner

Primary Examiner—Nina Bhat
(74) Attorney, Agent, or Firm—Sughrue Mion, PLLC

(57) ABSTRACT

Spreadable gelled syrup compositions are described which comprise syrup, and agar in an amount sufficient to form a gel. Also described are processes for the production of a spreadable gelled syrup composition which comprises dispersing solubilized agar through a syrup at a temperature which is above the gelation temperature of the agar, and thereafter cooling the composition so as to allow formation of a gel.

12 Claims, No Drawings

SPREADABLE GELLED FOOD PRODUCT

This invention relates to spreadable gelled food products and process for the production of the same.

Syrups, such as honey, maple syrup, molasses, sugar cane syrups, and other viscous syrups principally containing sucrose, glucose, fructose and/or other sugars dissolved in water, find wide application as industrial food ingredients, in cooking, beverages, and as spreads. Syrups referred to here typically contain at least about 50%, and generally 70% or more, of dissolved sugars and are substantially self-preserving.

Of all the syrups, honey has a particularly universal appeal. Whilst it has many uses as an industrial food ingredient and in cooking and beverages, honey is used most widely as a spread on bread, toast or crackers and the like.

When used as a spread, honey has one much disliked aspect—that of being very runny or fluid. When spooned from a jar it is difficult to stop the honey from dribbling where it is not wanted. This aspect is even more unpopular when honey is applied to hot toast. The honey becomes even more fluid due to its absorption of heat and consequent reduction in viscosity. As a result, the honey dribbles on to the fingers and the clothes of the consumer, as well as on his plate or the table. Similar problems are found with other syrups.

Clearly, it is of advantage to be able to supply to consumers honey and other syrups in such a form that the above negative aspects of fluidity, especially at an elevated temperature, are overcome. Such an idea is not of itself new. Thus, it is traditional to convert honey to a candied form resulting in the formation of sugar crystals, preferably very fine crystals. The viscosity of candied honey is much higher than normal honey and therefore the tendency to run off toast or bread is reduced. However, candied honey (also referred to as creamed honey) often suffers from the opposite negative aspect in being so viscous that it is spread only with diffculty, often resulting in breakage of slices of bread or toast on which it is spread. This problem is a particular problem in cold weather, when candied honey becomes even more viscous.

BACKGROUND OF THE INVENTION

Several references exist which describe efforts to produce honey products which overcome the runny character of honey when used as a spread. Zelenak (Hungarian Patent T41974) describes a gelled honey requiring use of carrageenan, water, pH adjustment with citric acid, potassium sorbate as preservative, a buffer salt such as disodium hydrogen or sodium hexametaphosphate as well as some xanthan gum or sodium alginate. The final preferred soluble solids content of the gelled honey product was 65%. Thus the honey content in the final product was somewhat diluted—no doubt as a consequence of the water required to dissolve the carrageenan and other gums and salts prior to mixing with honey.

Brain et al (U.S. Pat. No. 4,532,143) produced a semi-gelled honey using a mixture of two different pectins preferably at a final soluble solids content of 62–68%, the final composition being substantially free of supplemental acid or alkaline earth metal cations.

A minimum of 0.5% pectin was necessary to obtain the benefits of the invention the preferred range being 0.5–2%, more especially 0.75–1.25% of the pectins. The product finally was pasteurised. During processing the product is subject to high temperatures, such as from about 66° C. to 94° C. (150° C.–200° F.).

It is a characteristic of honeys that exposure to elevated temperatures results in deterioriation of flavour aroma and colour. The higher the temperature and the longer the exposure the more severe will be the quality deterioration. Temperatures in excess of about 60° C. can be deleterious. A safer range is 50 to 55° C. or even 45–46° C. Quality aspects which can be lost as a consequence of excessive heating include loss of delicate flavour character, loss of brilliance and clarity and darkening of colour. Excessive heating can result in development of opacity to some degree. It can also result in the more rapid development of hydroxymethylfurfural which has a deleterious effect on honey quality.

SUMMARY OF THE INVENTION

This invention has as its main aim the production of a form of syrup, particularly honey, whereby the syrup loses to a substantial extent its tendency to be runny or fluid (especially at warm temperatures) without involving the mandatory use of added acids, salts, buffers or other mineral salts and not requiring the mandatory use of pectins, gums or other hydrocolloids or of mixtures of hydrocolloids other than agar-agar (agar). Surprisingly, it has been found that use of very low levels of agar, in amounts sufficient to form a gel, can be effective in changing the physical characteristics of the syrup as required. It is possible to produce a well-gelled form of honey or other syrup having a tender melting texture in the mouth but with a stable gel structure in storage even for extended periods as well as in a warm or hot situation as, for example, on hot toast. Thus, as little as 0.05% of agar will produce an acceptable result. From about 0.2 to 0.5% w/w, of agar in the final preparation is preferred. Agar may be used in excess of this indicated range if required. Because of the low concentration of hydrocolloid required, a relatively small amount of water or other aqueous solutions will suffice to pre-dissolve the agar before mixing with syrup. As a consesquence, a composition having a very high proportion of syrup, such as honey, results.

In accordance with a first aspect of this invention there is provided a spreadable gelled syrup composition which comprises said syrup, and agar in an amount sufficient to form a gel. The syrup is preferably honey. Some examples of other syrups which may be used in the invention include maple syrup, molasses, sugar cane syrup (sometimes known as "golden syrup" and "treacle") and malt extract. The composition may additionally contain added water in which the agar is initially pre-dissolved.

In accordance with another aspect of the invention there is provided a process for the production of a spreadable gelled syrup composition which comprises dispersing solubilised agar through a syrup at a temperature which is above the gelation temperature of the agar, and thereafter cooling the composition so as to allow formation of a gel.

In accordance with a further aspect of this invention there is provided a process for the production of a spreadable gelled syrup composition which comprises dissolution of agar in water in the presence of heat, warming a syrup to a temperature which is above the gelation temperature of agar, and dispersing the dissolved agar uniformly in the warm syrup, and thereafter cooling the composition so as to allow formation of a gel.

In a further aspect there is provided a process for the production of a spreadable gelled honey composition which comprises dispersing solubilised agar through honey at a temperature which is above the gelation temperature of the agar and which is not deleterious to the honey, and thereafter cooling the composition so as to allow formation of a gel. On cooling to ambient temperature (between about 15° C. to about 30° C.) the composition remains fluid and non-gelled for about six hours or longer.

In a further aspect of the invention there is provided a process for the production of a spreadable gelled honey composition which comprises dissolution of agar in the presence of heat, warming honey to a temperature which is above the gelation temperature of agar and which is not deleterious to the honey, and adding the dissolved agar to the honey so as to disperse the agar therethrough, wherein on cooling to ambient temperature (between about 15° C. to about 30° C.) the resultant honey composition remains fluid and non-gelled for about 6 hours or more, after which gelation develops.

In contrast, according to the invention as presently claimed, a syrup, preferably honey, is heated to a temperature between 35° C. and 60° C. being a temperature non-deleterious to the syrup in particular honey solution, and above the gelation temperature of the agar (see claim 29).

The high concentration of honey in the final product may be achieved by the following features:

1. Because a gelled product can be achieved by use of very low concentrations of hydrocolloid, very little water is required in which to pre-dissolve it. Hence the degree of dilution is very modest when this small amount of solution is mixed with honey. Thus the final honey concentration in the finished product can be in excess of 70% and typically in excess of 90%.

2. By further processing as will be described hereafter, a gelled honey product can be prepared containing effectively no added water, so that the honey concentration in the finished product is about 99%—the only final non-honey component being the hydrocolloid used.

An advantage of using agar in the production of a spreadable, gelled honey composition is that the honey temperature throughout processing can be kept low, for example 50–60° C. or even lower. The relatively small amount of hot agar solution has only slight impact on the temperature of the predominant proportion of honey in the composition. As agar has the unique property of not gelling below about 35° C. to about 40° C., the honey-agar blend can be held satisfactorily during processing and filling operations at moderate temperatures without the problems of pre-gelation as can occur with hydrocolloids such as pectins, alginates and the like. It has however further been found most surprisingly, that when agar is used in honey as will be described hereafter, the development of the gelled condition is delayed such that when the honey-agar mixture reaches ambient temperatures (about 15° C. to about 30° C., generally about 20° C. to about 30° C.) at which agar would normally gel, the mixture remains fluid. A tender spreadable gel begins to develop after about 6 hours or more. However, the firmness of the gel structure continues to develop over several days. This unexpected feature has important implications in relation to ease of industrial handling of a honey-agar gelled product, as will be described hereafter.

It is further observed that because a solution of agar in water is relatively fluid—much more fluid than honey and very much more so than other hydrocolloids or hydrocolloid mixtures—there is no increase and indeed actually a decrease in the tendency to air inclusion in the honey-agar product during blending and other industrial operations. Consequently deaeration of the final product is not required as a consequence of mixing the agar solution into the honey.

The gelled honey product according to the embodiment of the invention has a very tender easy to spoon and spread texture, with good clarity and a soft mouthfeel without any graininess. The honey flavour is readily released in the mouth so a full flavour impact is achieved. When the product is spread on hot toast it remains in its gel form and does not run off the surface of the hot toast as is the case with natural honey. The tendency of normal honey to dribble from a spoon is completely overcome. The gelled honey is tender, easy to spoon and spread and overcomes the spreading difficulties often associated with candied honey.

The invention is also applicable to spreadable gelled syrup products based on mixtures of 2 or more syrup-type foods with or without other flavourants or normal food components.

DETAILED DESCRIPTION OF THE INVENTION

Syrups which may be used in this invention include honey, maple syrup, molasses, sugar cane syrups, and other syrups which principally contain sucrose, glucose, fructose and/or other, sugars dissolved in water. Honey is particularly preferred and the following description refers largely to the use of honey. It is to be understood that the invention is not so limited and extends to compositions and processes involving other syrups including those discussed above, and combinations thereof.

Honeys used in this invention may be of any type. There is, world-wide, an enormous variety of honeys. Some are very characteristic in their flavour, aroma and colour while others, while having generic honey characteristics, are not all that different or unique. It has been found that any type of honey is suitable for use in the products of this invention. Typically natural honeys vary from 80–82% soluble solids (SS) but some will be lower and others higher. Such variation in SS levels represents no problem in the implementation of this invention. Likewise the pH of honey, normally about 4, is quite suitable for production of a stable agar gel.

As mentioned above, agar has been found to give highly advantageous results in the production of spreadable gelled syrups, particularly honey. Agar is a hydrocolloid extracted from selected seaweeds and discovered originally in Japan. It is widely used in special foods, in microbiological media and also in special confectionery products. Various grades of agar are available and these differ in gel strength from as low as 150 up to 1000 g/cm$^2$ or above (Japanese Agar Gel Strength Standard in "Food Gels" Elsevier 1990, pp 23–25). It is preferred to use agar having a gel strengh from about 500 to about 1200 g/cm$^2$. It is particularly preferred to use agar having a gel strength of about 1000 g/cm$^2$, which is the grade of agar exemplified herein. It will be understood that use of grades of agar having different gel strengths will require adjustment of rates of usage.

The amount of agar used will depend upon the gel strength of the agar. Less agar is generally required in the situation where the gel strength is greater than 1000 g/cm$^2$, compared with that required when the gel strength is less than about 800 g/cm$^2$. For agars having a gel strength from about 500 to about 1200 g/cm$^2$ a satisfactory gel is generally formed when the agar is present in an amount from about 0.05% to about 2.5% (w/w). Where the gel strength of the agar is, for example, between about 800 g/cm$^2$ and 1200 g/cm$^2$ it is generally preferred to utilise agar in an amount from about 0.05% to about 1.5% (w/w/).

In accordance with a first aspect of this invention there is provided a spreadable gelled syrup composition which comprises said syrup, and agar in an amount sufficient to form a gel. Where the composition contains added water, it is present in an amount from about 0.5% to about 15% (w/w). Very small amounts of agar may be used to form a gel with honey or other syrup. By way of example, agar in amount from 0.05% to 2.5% (w/w) may be used, particularly from 0.1% to 2%, more particularly from 0.2% to 0.5% w/w. The agar may be dissolved in a small amount of aqueous solution (generally water) in the presence of heat, as is described in more detail hereafter.

The spreadable gelled honey composition is in the form of a gel, this gelation being conferred by the agar. The honey forms part of the gel matrix. The gel is spreadable in the sense that it is capable of being spooned or spread onto an edible substrate. The gel is not fluid in the sense that it does not dribble like conventional honey, instead retaining an integral or coherent structure which is sufficiently soft to enable the gel material to be spread in a manner which is not dissimilar to pectin containing jams and like products.

The honey composition may comprise from 70% to about 99% weight/honey, the remainder comprising agar and water. Water may be used to dissolve the agar prior to its addition to the honey. This added water may be substantially removed from the honey composition utilising standard methods as described herein. As a consequence, the honey composition may comprise solely honey and agar. Agar is generally present in an amount from 0.05% to about 2.5%, such as from 0.1% to 1% w/w, more particularly from 0.1% to 0.5% w/w.

The soluble solids of the honey composition according to this invention may be in the range from about 70% to about 85%.

In one embodiment, the invention thus relates to a spreadable gelled honey composition which comprises from about 0.05% to 2.5% (w/w) agar, from about 70% to about 99% (w/w) honey, and optionally water. Added water (i.e. water other than that contained in honey or other syrup-type components), where present, may be in an amount from about 0.5% to about 15% (w/w). The composition preferably has a soluble solids content between about 70% to about 85% (w/w).

Honey compositions which contain from 80% to about 99% honey, and soluble honey solids in the range from about 70% to 85% (w/w), which may be produced in accordance with this invention, have the distinct advantage of maintaining the colour, clarity and organoleptic properties of honey. The product is therefore essentially identical with regard to colour, taste and smell, with that of conventional honeys.

Supplementary ingredients may be included in the honey compositions of this invention where it is desired to modify the taste or appearance of the honey. Supplementary ingredients may include spices or spice extracts, plant extracts, fruit flavours or fruit concentrates, flavour modifying agents such as bittering agents, salts, acids, and other commonly used food ingredients. When present such materials may be employed in an amount from about 0.01% to about 10% w/w of the final composition.

Honey compositions may also include added sugars, such as sugars corresponding to those normally present in honey, namely glucose and fructose. Where other syrups are used, sugars which are conventionally found in such syrups may also be added. The addition of sugars, which may be dissolved in the agar solution prior to its addition to the honey or other syrup, have the effect of increasing the soluble solids content of the gelled product. Such materials may be included to increase the soluble solids content in an amount such as from about 0.5% to 10% w/w of the final composition.

In accordance with another aspect of the invention there is provided a process for the production of a spreadable gelled syrup composition which comprises dispersing solubilised agar through a syrup at a temperature which is above the gelation temperature of the agar, and thereafter cooling the composition so as to allow formation of a gel.

In another aspect this invention is directed to a process for the production of a spreadable gelled syrup composition which comprises dissolution of agar in water in the presence of heat, warming a syrup above the gelation temperature of agar, adding the dissolved agar to the warm syrup so as to disperse the dissolved agar therethrough, and thereafter cooling the composition so as to allow formation of a gel.

In a further aspect there is provided a process for the production of a spreadable gelled syrup composition which comprises dispersing solubilised agar through the syrup at a temperature which is above the gelation temperature of the agar and which is not deleterious to the syrup, and thereafter cooling the composition so as to allow formation of a gel. On cooling to ambient temperature (between about 15° C. to about 30° C.) the composition remains fluid and non-gelled for about six hours.

In a particularly preferred embodiment there is provided a process for the production of a spreadable gelled honey composition which comprises dissolution of agar in water in the presence of heat, warming honey to a temperature which is above the gelation temperature of agar and which is not deleterious to the honey, and adding the dissolved agar to the honey so as to disperse the agar therethrough, wherein on cooling to ambient temperature, which is below the gelation temperature of agar, the resultant honey composition remains fluid and non-gelled for a period of time thus facilitating processing of the honey composition. Generally, when cooled to an ambient temperature between about 15° C. to about 30° C. the honey composition does not gel for about six hours. At a temperature around 20° C. gelation generally occurs at around 18 to 24 hours, a tender gel structure being formed. The firmness of this gel increases after about a further 24 hours.

Where it is indicated that the solution of agar in water is added to syrup which has been heated to a temperature which is above the gelation temperature of the agar solution, the underlying reason is to ensure that none of the aqueous agar solution is cooled to below a temperature at which pre-gelation of said aqueous solution may occur. In fact, once the aqueous agar solution is thoroughly admixed with the syrup its tendency to pre-gel is completely overcome, such that the syrup-aqueous agar solution, when thoroughly admixed, will not be subject to gelation for several hours after the mix cools to a temperature at which formation of a gel may occur.

While it is not always practicable, it is conceivable that if the mixture of syrup and aqueous agar solution can be instantly mixed homogeneously, the temperature of the syrup would not have to be above the temperature at which the aqueous agar solution would gel.

However, in practice, it is most convenient to warm the syrup to a temperature above the aqueous agar solution geling temperature. Such warming also reduces the viscosity of syrup and this improves its handling and mixing characteristics.

A feature of an embodiment of this invention is that the honey is not subject to heating to the extent that its intrinsic qualities are negatively affected, that is, honey may be heated to a temperature which is above the gelation temperature of agar and which is not deleterious to the honey.

It is common practice in the honey industry for honey to be carefully warmed to reduce its viscosity to allow for more efficient pumping, filtration, blending, deaeration and filling of the product into the final container. However, persons skilled in the art are careful not to exceed about 50–55° C. and preferably 45–46° C. to avoid deterioration of flavour, colour and brightness. At the same time, for some honeys it is necessary to heat the honey to about 60° C. in order to avoid granulation (sugar crystallisation) on subsequent storage. In practising this invention it is not ncessary to exceed a product temperature of 50–55° C. or even the most preferred temperature 45–46° C. The fluidity of the product during preparation is such that it may be readily pumpted, filled and generally handled without problems.

To prepare a gelled honey product in accordance with an embodiment of this invention it is convenient, though not mandatory, for the honey to be carefully warmed to about 50° C. in order to increase its fluidity and its ease of mixing. This is because a concentrated agar solution in water is required to be thoroughly and uniformly admixed throughout the honey. However, if a honey is especially heat sensitive it will suffice to warm the honey to about say 40–45° C. though the viscosity at 40–45° C. will be greater than 50° C.

The gelation temperature of agar in water is somewhat variable depending on the grade, source and concentration of the agar. Generally, however, the gelation temperature of agar is normally 30° C. to about 40° C.

Separately a solution of agar in aqueous solution, generally water, is prepared. The amount of agar used is that which is capable of forming a gel in the presence of honey or another syrup or mixtures thereof. From about 0.05% to 2.5% (w/w) may be used, such as from 0.1% to 1% (w/w), more preferably 0.1% to 0.5% (w/w) of the final composition. A greater amount of agar may be used, however, it is preferred to use small amounts of agar such as from 0.01% to 1% (w/w). To achieve complete solution of agar in water, it is generally necessary to hold the agar-water mix at close to 100° C. (or above) until all the agar particles are totally dissolved. Depending on the grade of agar used, solution can require as little as a few minutes or as much as half an hour or more. It is desirable to maintain a uniform proportion of agar and water so that the exact composition of the ultimate agar-water-honey mix is known. Hence during dissolution of agar evaporation of water is minimised. Alternatively, the proportion of agar to water is maintained by controlled addition of water to make up the water lost by evaporation.

A solution of agar in water is relatively fluid, indeed much more fluid than is the case with most other hydrocolloids. This contributes to the ready dispersiblity of an agar solution throughout the honey, and also tends to reduce viscosity after mixing thoroughly with the honey.

In its simplest form a gelled honey product based on this invention comprises mixing a quantity of agar, completely dissolved in water, with a measured quantity of honey, generally in an amount of 70% to 95% w/w, at a temperature which will facilitate easy mixing without loss of honey quality. The honey and the agar solution may be mixed together at say 40–50° C. (the agar may be cooled to 40°–50° C., or added at a temperature from 50° to 100° C., given the small volume of addition), without any problems of agar pre-gelation or of overheating effects on honey. The mixture so produced will not gel immediately on cooling to a temperature at which a simple agar solution in water would gel, which, while somewhat variable depending on grade, source, concentration and other aspects, is normally about 30° to 40° C.

Surprisingly, the honey-agar mixture does not set immediately on cooling to a temperature such as 15° to 30° C. which is below the normal gelation temperature of agar. This has a number of advantages. Firstly, there is no need to maintain a critical temperature for filling to avoid pre-gelation, as is the case with pectin gels and gels produced by other hydrocolloids or hydrocolloid mixtures. In industrial operations this is very important. For example, if a pectin-based product is allowed to pre-gel, the whole batch of product is lost and this is of considerable financial concern. Secondly, it is much easier to clean up industrial equipment if the remaining food has not formed a gel in the pumps, pipes, valves and other machine parts. Thirdly, since the basic product of the invention comprises honey (or other syrup) and agar solution, it is easy to standardise products awaiting final filling, the only test required being to confirm a desired level of soluble solids. By contrast, pectin gels usually require tests, in addition to soluble solids, such as pH, and setting capability, with other systems additionally require control of mandatory additions of acids, mineral salts and the like.

The above described mixing of an agar solution with honey results in a product which does not gel for at least about 6 hours at a temperature between about 15° C. and 30° C.

By about 24 hours the composition will show the initial formation of a gelled structure. By this is meant that the product, when spooned from a jar and placed on a flat surface. will to a large extent retain its shape and if inclined will not flow in a manner typical of normal honey. With the passage of time the firmness of the gel will increase such that after a few days of storage a gel having tender mouthfeel and excellent flavour release will have formed.

As mentioned above, additional sugars may be added to the honey composition in order to increase the SS of the final product and to off-set any dilution due to the addition of water in which the agar is dissolved. If it is desired to do this it is preferable to add the principal sugars which are naturally present in honeys. These sugars are fructose and glucose, and may be added in a proportion to each other which would not be conducive to granulation (crystallisation) of the honey sugars (for example 1.65:1 or more being the ratio of fructose to glucose, say 6.3 parts of fructose to 3.7 parts of glucose). This results in maintenance of a natural level of sweetness in the final product.

As a further alternative to the basic gelled honey product, a final product can be achieved containing only honey and agar, wherein the quantity of water required to dissolve agar can be first totally or almost totally removed from the base honey before mixing with the agar solution. Alternately the mixture of honey/agar solution can be treated to remove all or almost all of the mosture added as part of the agar solution. Removal of moisture as herein described can be effected at a comparatively low temperature (for example 50° C.) by vacuum concentration until the required moisture removal is achieved. In the above procedures, that water required to pre-dissolve agar may be regarded as "temporary" being utilised solely for the purpose of achieving an agar solution, then being removed in effect after transferring the agar in a dissolved form into the liquid honey.

This invention is based on the surprising finding that agar may be used to produce a spreadable gelled honey product, which product maintains the colour, clarity and organoleptic properties of honey. Whilst the prior art has contemplated the use of carrageenans (Hungarian Patent T41974) and pectins (U.S. Pat. No. 4,532.143) to produce gelled honey, such proposals having been made in excess of ten years ago, it has hitherto never been contemplated to utilise agar in the production of spreadable gelled honey. The use of agar may not have been contemplated due to perceived problems of gel formation, adverse effects on colour, clarity and/or organoleptic properties of honey, or other factors.

This invention will now be described with reference to the following non-limiting Examples.

EXAMPLE 1

Honey having a soluble solids content of 82.4% was warmed carefully to 50° C. Separately, agar was dissolved in water at 100° C., using agar of a gel strength of 1000 g/cm$^2$. When the agar solution was fully dissolved, the requisite quantity was mixed thoroughly with an appropriate quantity of honey in accordance with the following formula:

| | | |
|---|---|---|
| Honey 82.4% SS | 1000 g | |
| Water @ 100° C. | 100 g | |
| Agar (1000 grade) | 2.7 g | Thoroughly dissolved in the water at 100° C. without loss of moisture, then cooled to 60° |

After mixing was complete the temperature was still about 50° C. The product was quite fluid. It was filled into jars which were fitted with metal twist closures, then left standing at ambient temperature (around 15–20° C.) to cool. The product was still quite fluid and had not gelled when ambient temperature was reached. After standing 18–24 hours a tender gel structure had formed. The firmness increased within a further 24 hours. The final product contained in excess of 90% honey by weight, was quite clear and of the same colour and flavour as the honey used as the major ingredient. The SS of the final product was 74%.

EXAMPLE 2

A product was prepared resembling that of Example 1 except that a small quantity of glucose and fructose was dissolved in the hot agar solution prior to its mixing with the honey. Thus, in addition to the ingredients used in example 1, 51 g of fructose and 29 g of glucose were used. The product behaved in a way already described in Example 1 with regard to the development of a gelled structure. When a gel structure had developed, the product could be spooned out of the jar and no dribbling strands of honey formed. When the product was spread on hot toast, it did not become fluid but remained as a tender gel on the surface. When eaten, a full natural honey flavour and mouthfeel was delivered by the product. The final product contained in excess of 84% honey and the SS was 76%.

EXAMPLE 3

A Honey product was prepared as in Example 1 but without allowing gel to form. The composition was maintained at 50° C. and treated in a warmed vacuum chamber under a vacuum of 30 inches until a desired amount of water had been removed. The targeted moisture removal was as much or almost as much as the water required to dissolve the quantity of agar used to make the product.

When the required weight of water had been removed from the honey product, containers were filled, lidded and allowed to set to a gel over several days. A product resembling that produced in Examples 1 and 2 resulted except that the SS content was 82.0%. The honey used to make the product was 82.4% SS. The gelled honey product of Example 3 had a very full flavour, light brilliant colour and had formed a tender spoonable gel which did not dribble when spooned from the jar and did not melt on hot toast. When eaten the flavour release was excellent. The final gelled honey product comprised 97.3% of honey and had a SS content of 82%.

EXAMPLE 4

A product containing honey, an agar solution, fruit juice concentrate and supplementary sugars is here described. Honey was carefully warmed to 50° C. Separately an agar solution was prepared. Separately a quantity of passionfruit concentrate was adjusted to a pH of 4.0 using a measured addition of sodium citrate, then warmed to 50° C. This rendered the honey and juice concentrate to the same or similar pH's. Fructose was dissolved in the agar solution ensuring that the temperature did not fall below the gelation temperature of agar. The three components—honey, juice concentrate and agar solution—were thoroughly mixed so the temperature was well above the agar gelation temperature, then filled into jars and cooled as in Example 1.

The ingredients were in the following proportions:

| | |
|---|---|
| Honey 82.4% SS | 73% by weight |
| Water @ 100° C. | 8.76% by weight |
| Agar (1000 grade) | 0.23% by weight |
| Fructose | 11.52% by weight |
| Passionfruit juice concentrate | 5.85% by weight |
| Sodium citrate | 0.65% by weight. |

A tender gel structure developed in the product having a pleasant balance of honey and fruit flavours. The product could be spooned readily without dribbling and could be spread easily on hot toast without becoming runny. The SS of this product was 74.3%.

EXAMPLE 5

Golden Syrup is a golden-brown syrup product produced by cane sugar refiners. It has a delicious flavour but it has a runny viscosity—similar to honey. It is difficult to spoon without dribbling. When spread on bread or hot toast, the syrup becomes very runny.

A product containing golden syrup, agar, water and supplementary sugar may be produced in accordance with the following formula:

| | |
|---|---|
| Golden syrup 78.2% SS | 71.3% by weight |
| Agar (1000) grade | 0.2% by weight |
| Water | 7.12% by weight |
| Glucose monohydrate | 9.40% by weight |
| Fructose | 11.98% by weight |

Steps for preparation were as in Example 2.

The final SS content of the gel was 79.4%.

The gel was easily spooned from the jar without dribbling, and spread easily on hot toast without becoming runny. The flavour release was excellent. The flavour was exactly like the golden syrup used to make the product.

What is claimed is:

1. A spreadable gelled syrup composition free from flavor, aroma and/or color deterioration, which comprises syrup in an amount from about 70% to about 99% w/w, and very low levels of agar in an amount from 0.1% to 0.5% w/w having gel strength from about 500 g/cm$^2$ to about 1200 g/cm$^2$, the gel having integral structure which is spoonable without dribbling and of sufficient softness enabling the gel to he spread on a substrate, wherein said syrup is prepared by warming to a temperature which is not deleterious to the syrup.

2. A composition according to claim 1, wherein said syrup is selected from honey, maple syrup, molasses, sugar syrups, malt extract, fruit concentrates and mixtures thereof.

3. A composition according to claim 1, wherein said syrup is honey, the composition containing honey-derived soluble solids in the range of from about 70% to about 85% w/w.

4. A composition according to claim 1, which additionally comprises added sugars, such sugars corresponding to those normally present in the syrup.

5. A composition according to claim 4, wherein said sugars are glucose and fructose.

6. A composition according to claim 1, which is free of supplementary acid, added cations or anions.

7. A composition according to claim 1, wherein said syrup is prepared by warming to a temperature between about 35° C. and 60° C.

8. A process for the production of a spreadable gelled syrup composition, which comprises warming said syrup to a temperature non-deleterious to the syrup and above the gelation temperature of the agar solution, dissolving agar in water having a gel strength between about 500 g/cm$^2$ to 1200 g/cm$^2$ in water at a temperature above the gelation temperature of said agar, adding the dissolved agar to the syrup to give agar in syrup in an amount of 0.1% w/w/ to 0.5 w/w/, and thereafter cooling the resultant composition so as to form a gel wherein at ambient temperatures the composition remains fluid and non-gelled for about six hours.

9. A process according to claim 8, wherein said syrup is selected from honey, maple syrup, molasses, sugar syrups, malt extract, fruit concentrates and mixtures thereof.

10. A process according to claim 8, wherein said syrup is honey and wherein the content of the honey derived soluble solids in the composition is in the range from about 70% to about 85% w/w.

11. A process according to claim 8, wherein glucose and fructose are dissolved in the agar solution prior to addition to the syrup in order to increase the solids content thereof.

12. A process according to claim 8, which comprises warming said syrup to a temperature between about 35° C. and 60° C.

* * * * *